(12) United States Patent
Hampson et al.

(10) Patent No.: US 10,556,249 B2
(45) Date of Patent: Feb. 11, 2020

(54) ROBOTIC END EFFECTOR AND METHOD FOR MASKLESS PAINTING

(71) Applicant: The Boeing Company, Chicago, IL (US)

(72) Inventors: Benjamin Lloyd Hampson, Kent, WA (US); Megan Marie Petersen, Seattle, WA (US); James Charles Van Avery, Renton, WA (US)

(73) Assignee: The Boeing Company, Chicago, IL (US)

(*) Notice: Subject to any disclaimer, the term of this patent is extended or adjusted under 35 U.S.C. 154(b) by 262 days.

(21) Appl. No.: 14/885,408

(22) Filed: Oct. 16, 2015

(65) Prior Publication Data

US 2017/0106393 A1 Apr. 20, 2017

(51) Int. Cl.
| | |
|---|---|
| *B05C 1/02* | (2006.01) |
| *B05B 13/04* | (2006.01) |
| *B05C 11/10* | (2006.01) |
| *B05D 1/02* | (2006.01) |
| *B05D 1/28* | (2006.01) |
| *B25J 9/16* | (2006.01) |
| *B25J 11/00* | (2006.01) |
| *B25J 15/00* | (2006.01) |
| *B64C 3/00* | (2006.01) |
| *B64F 5/00* | (2017.01) |

(52) U.S. Cl.
CPC .......... *B05C 1/027* (2013.01); *B05B 13/0431* (2013.01); *B05C 11/1026* (2013.01); *B05D 1/02* (2013.01); *B05D 1/28* (2013.01); *B25J 9/1664* (2013.01); *B25J 11/0075* (2013.01); *B25J 15/0019* (2013.01); *B64C 3/00* (2013.01); *B64F 5/00* (2013.01); *Y10S 901/02* (2013.01); *Y10S 901/43* (2013.01)

(58) Field of Classification Search
USPC ....... 118/323, 321, 692, 693, 684, 696, 697, 118/201, 203, 264, 256, 683; 901/43
See application file for complete search history.

(56) References Cited

U.S. PATENT DOCUMENTS

| | | | |
|---|---|---|---|
| 4,605,569 A | 8/1986 | Shimada et al. | |
| 4,790,259 A * | 12/1988 | Morris | B05C 1/025 118/266 |

(Continued)

FOREIGN PATENT DOCUMENTS

| | | |
|---|---|---|
| CN | 104324840 A | 2/2015 |
| EP | 0652053 A2 | 5/1995 |

(Continued)

OTHER PUBLICATIONS

"Chapter 8: Aircraft Painting and Finishing," Federal Aviation Administration, Aviation Maintenance Technician Handbook—Airframe, vol. 1, document No. FAA-H-8083-31, copyright 2012, 22 pages.

(Continued)

*Primary Examiner* — Yewebdar T Tadesse
(74) *Attorney, Agent, or Firm* — Yee & Associates, P.C.

(57) ABSTRACT

A robotic end effector includes a line painting system and a spray painting system for painting features on a surface. The line painting system includes a flexible wick for flowing lines onto the surface.

26 Claims, 12 Drawing Sheets

(56) References Cited

U.S. PATENT DOCUMENTS

| | | | | |
|---|---|---|---|---|
| 4,857,367 A | * | 8/1989 | Thorn | B05L 7/0807 |
| | | | | 118/323 |
| 4,995,338 A | * | 2/1991 | Morita | B05C 5/02 |
| | | | | 118/410 |
| 5,275,098 A | | 1/1994 | Larson | |
| 5,277,927 A | * | 1/1994 | Burns | B05B 12/082 |
| | | | | 427/284 |
| 6,001,181 A | * | 12/1999 | Bullen | B05C 5/0216 |
| | | | | 118/323 |
| 6,048,921 A | | 4/2000 | White et al. | |
| 6,531,025 B1 | | 3/2003 | Lender et al. | |
| 8,455,054 B2 | | 6/2013 | Brewer et al. | |
| 2011/0262622 A1 | * | 10/2011 | Herre | B05B 1/14 |
| | | | | 427/8 |
| 2013/0289766 A1 | | 10/2013 | Hafenrichter et al. | |
| 2015/0028051 A1 | | 1/2015 | Topf et al. | |
| 2015/0223596 A1 | | 8/2015 | Topf et al. | |

FOREIGN PATENT DOCUMENTS

| | | | |
|---|---|---|---|
| JP | 2002112838 A | * | 4/2002 |
| JP | 2002112838 A | | 4/2002 |

OTHER PUBLICATIONS

"Painting Fuselage, Wings & Tail Sections: Using the Poly Fiber System Painting Method," challengers101.com, site established Sep. 2003, 7 pages, accessed Oct. 6, 2015. http://www.challengers101.com/Painting_PolyFib.html.

Extended European Search Report, dated Mar. 14, 2017, regarding Application No. EP16192553.2, 8 pages.

European Patent Office Extended Search and Communication Report, dated Apr. 10, 2019, regarding Application No. 16192553.2, 6 pages.

* cited by examiner

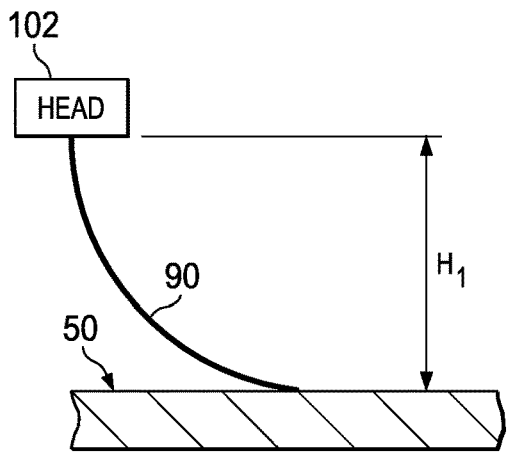 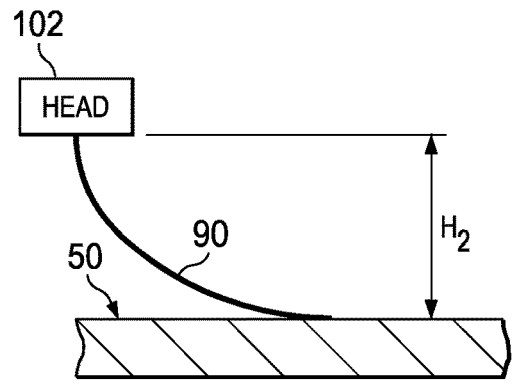
FIG. 10A  FIG. 10B
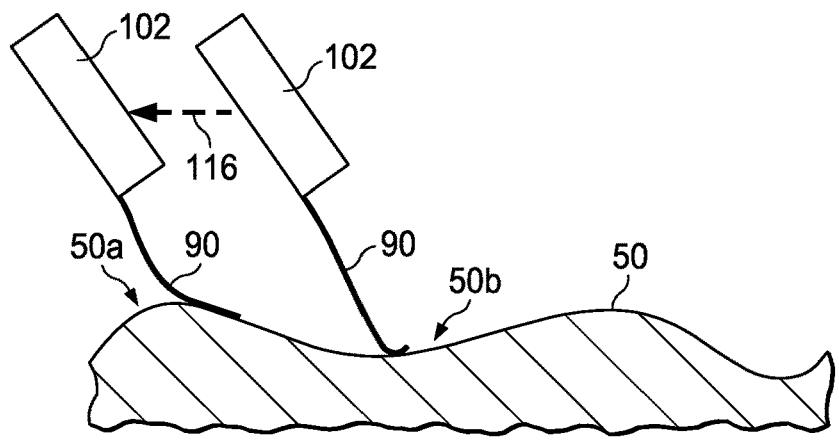
FIG. 11
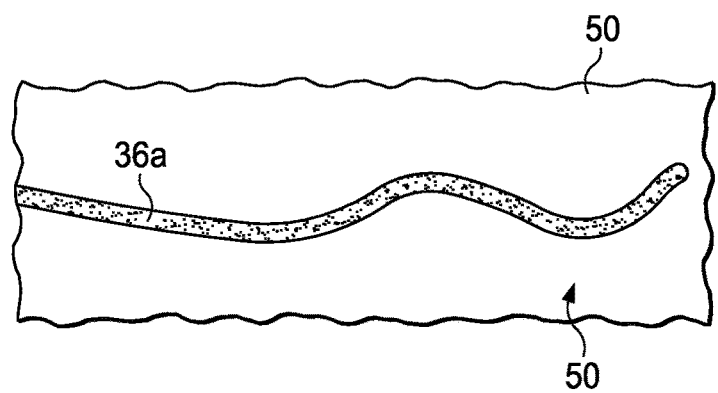
FIG. 12

ROBOTIC END EFFECTOR AND METHOD FOR MASKLESS PAINTING

BACKGROUND INFORMATION

1. Field

The disclosed embodiments generally relate to the application of coatings such as paint to surfaces, and deals more particularly with a device and method for painting patterns or features such as lines on a surface.

2. Background

When applying coatings such as paint on a surface, it is often necessary to mask those areas of the surface that are not intended to be coated. Mask materials, such as masking tape and/or paper may be used to form clean lines and/or shapes on the surface. For example, in the aircraft industry, lines, numbers and decorative features may be painted on the fuselage, wings and/or stabilizers of an aircraft.

In the past, in order to paint lines on the wings of an airplane, strips of masking tape and craft paper have been used to mask off those areas around the lines that are to be painted. The exposed areas of the wing surface between strips of the masking tape were then spray-painted, following which the masking tape was removed, leaving painted lines. This process had a number of disadvantages. Paint creep could occur beneath the masking tape, reducing the sharpness of the edges of the lines. The edge of masked-off paint lines may reduce aerodynamics and increase drag, and therefore fuel costs. Also, the preparation process involving layout and application of the masking tape and craft paper was time-consuming, labor-intensive and added to material costs. Finally, in those cases where the lines were to be painted over a fresh basecoat of paint on the airplane, it was necessary to wait until the basecoat was fully cured before the masking tape could be applied for painting lines, thereby adding to aircraft production time.

Accordingly, there is a need for a device and method for painting features such as lines on a surface that eliminates the need for masking materials and improves the sharpness and smoothness of the edges of the lines. There is also a need for an automated method of painting lines on a surface that obviates the need for manually masking of areas of the surface while also reducing VOC's (volatile organic compounds).

SUMMARY

The disclosed embodiments may be employed to paint lines and other features and/or patterns on a surface such as an airplane or other vehicles that may reduce or eliminate the use of masking materials. Lines may be directly applied to the surface without the need for atomizing the paint, thereby eliminating the need for paint application in a paint booth or similar controlled environment. The method allows painting lines that have cleaner and smoother edges. Elimination of the need for masking materials permits lines and features to be painted over underlying basecoats that have not fully cured, thereby reducing wait time and improving production rate. In one variation, the embodiments may be employed as an end effector on an automated robot, allowing lines and features to be painted under semi-automatic or fully automatic digital control. In another variation, the embodiments may employ a combination of a line painting system and spray painting system to paint wide strips and/or large area features on a surface.

According to one disclosed embodiment, apparatus is provided for applying a patterned coating on a surface. The apparatus comprises a fluid pump adapted to pump a coating fluid, and a line applicator adapted to be brought into contact with the surface for applying a line of the coating fluid on the surface. The apparatus also includes a dispensing tip coupled with the fluid pump and the line applicator for dispensing the coating fluid to the line applicator. The line applicator includes a wick adapted to be drawn over the surface and apply a line of the coating fluid on the surface. The line applicator is flexible and is adapted to be drawn across the surface. The wick may include a flexible gauze, and the dispensing tip may include an outlet through which the coating fluid is dispensed onto the gauze. The apparatus also includes a valve coupled between the fluid pump and the dispensing tip for controlling a flow of the coating fluid from the fluid pump to the dispensing tip. Each of the fluid pump and the valve is pneumatically operated. The apparatus further comprises a manipulator having the line applicator and the dispensing tip mounted thereon, and a CNC controller including digital control programs for controlling the manipulator. The apparatus also comprises a coating fluid spray gun mounted on the manipulator and adapted to be coupled with a source of the coating fluid for spraying the coating fluid onto the surface.

According to another disclosed embodiment, a robotic end effector is provided for painting features on a surface. The end effector comprises a head adapted to be mounted on a robotic manipulator and moved over the surface. A line applicator is mounted on the head, and is adapted to be brought into contact with and moved over the surface by manipulator. The end effector also includes a pump adapted to be coupled with a source of paint, and a paint dispensing tip mounted on the head for dispensing paint to the line applicator. The end effector may further comprise a valve coupled between the pump and the dispensing tip for controlling delivery of paint from the pump to the dispensing tip. The pump and the valve are each mounted on the head and are pneumatically operated. The line applicator may comprise a compliant wick adapted to flow the paint on to the surface, and is configured to flow a line of the paint onto the surface. The end effector may further comprise a paint spray gun mounted on the head for spraying paint onto the surface, and at least one source of paint carried on the head for supplying paint to the pump and to the paint spray gun.

According to still another disclosed embodiment, apparatus is provided for painting features on a surface, comprising a robot, an end effector, and a controller including digital control programs for controlling the robot and the end effector. The end effector includes a line painting system for painting a line of paint on the surface, and a paint spray system for spraying paint on the surface. The line painting system includes a flexible wick adapted to hold and flow paint onto the surface, and a dispensing tip for dispensing paint to the flexible wick.

According to a further disclosed embodiment, a method is provided of painting features on a surface. The method comprises moving a robotic end effector over the surface, using the robotic end effector to paint lines on the surface, and using the robotic end effector to spray paint onto the surface. The method may also include using the robotic end effector for painting a pair of spaced apart lines onto the surface, and using the robotic end effector to spray paint may include spray painting an area on the surface between the pair of the spaced apart lines. Using the robotic end effector to paint lines may comprise bringing a wick into contact with the surface, and dispensing paint onto the wick.

According to still another disclosed embodiment, a maskless painting method is provided, comprising delivering paint from a source of paint to a pump, and pumping the paint from the pump to a dispensing tip. The method also includes dispensing the paint from the dispensing tip to a wick, bringing the wick into contact with a surface, and painting features on the surface by moving the wick over the surface. The method may also include delivering the paint from the pump to a valve, and using the valve to control a flow of the paint from the pump to the dispensing tip. Moving the wick over the surface is performed using a numerically controlled manipulator programmed to move the wick along a path forming the features. Dispensing the paint to the wick includes substantially saturating the wick with the paint, and moving the wick over the surface includes flowing the paint from the wick onto the surface.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIGS. 10A and 10B are illustrations of diagrammatic side views showing flexing of the wick with changes in elevation of the end effector head above a surface being painted.

FIG. 11 is an illustration of a side view showing compliance of the wick with an undulating surface as the end effector moves across the surface at constant elevation.

FIG. 12 is an illustration of a plan view of a portion of a surface showing an irregularly curved painted line.

DETAILED DESCRIPTION

The disclosed embodiments provide a method and apparatus for applying coatings such as paint on a surface to form visually decorative or functional features. For example, the embodiments can be employed to carry out maskless painting of decorative lines and patterns on surfaces of vehicles such as aircraft. The embodiments may also be used to apply patterns of functional coatings on a wide range of surfaces and structures, including, for example and without limitation, as coatings used to indicate barely visible impact damage on an aircraft. As used herein, the terms "features" and "patterns" include a wide range of designs, strips, lines, images and the like which may be either decorative or functional. In the exemplary embodiment described below, the method and apparatus are employed to paint lines and strips on an aircraft, however principles of the disclosed embodiments are applicable to painting features and patterns on the surfaces of other structures.

Figure 1:
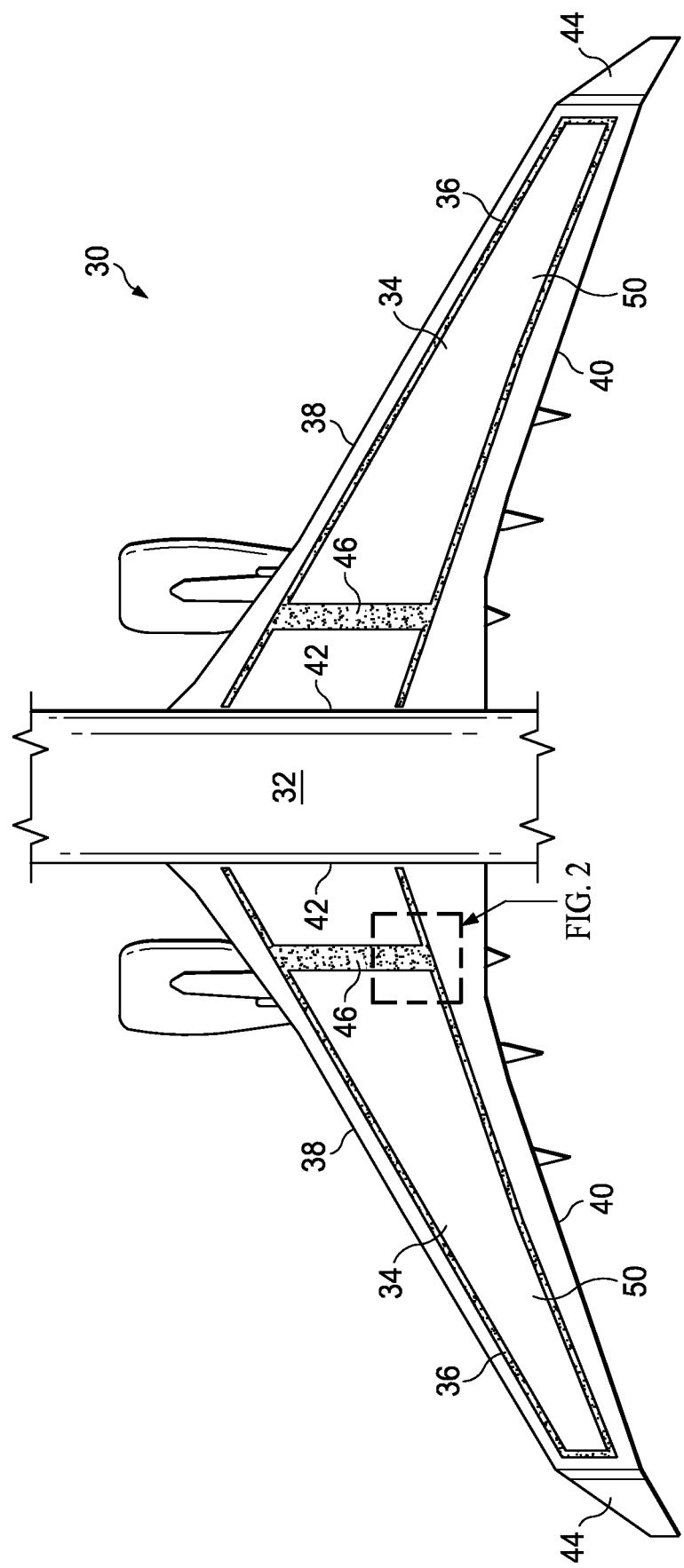
FIG. 1 is an illustration of a fragmentary plan view of an airplane, portions of the fuselage broken away.
Figure 2:
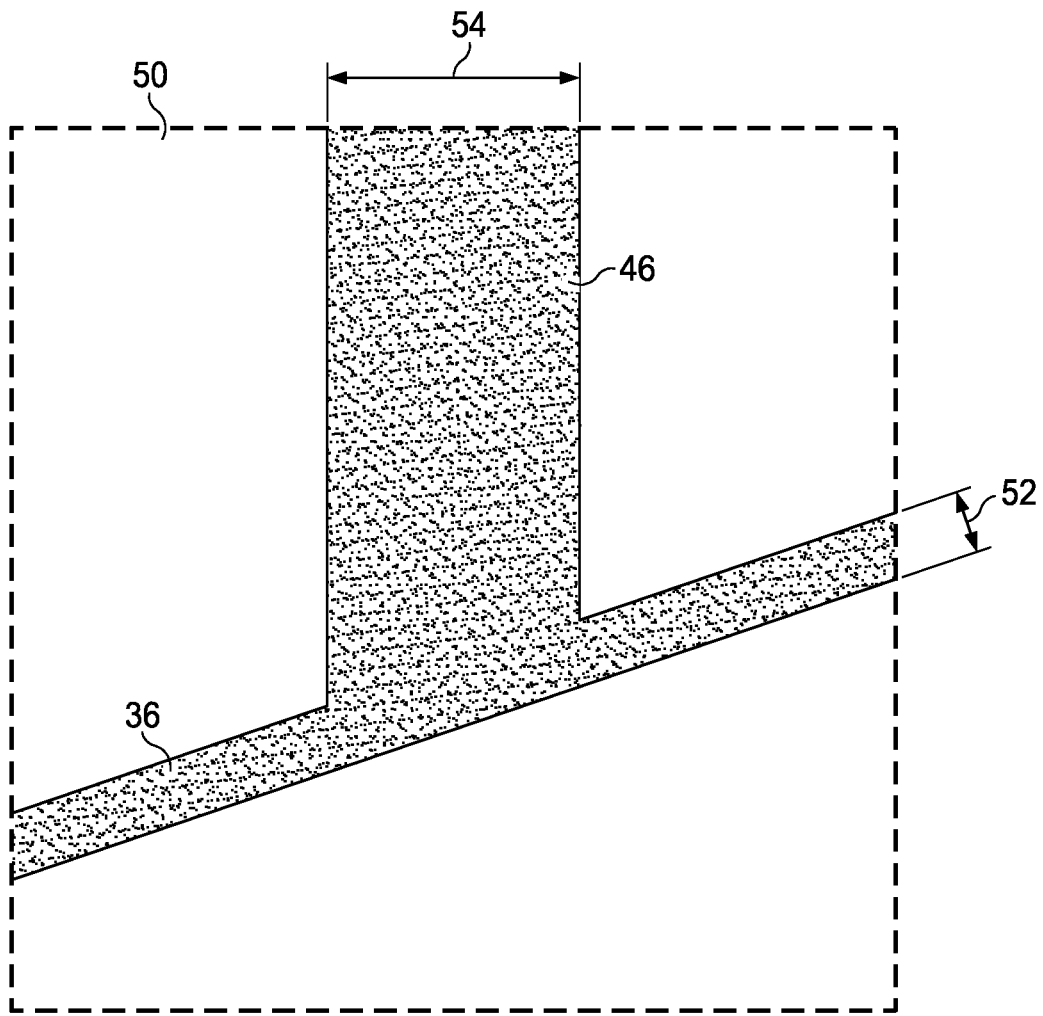
FIG. 2 is an illustration of the area designated as "FIG. 2" in FIG. 1.

Referring now to FIGS. 1 and 2, an airplane 30 comprises a fuselage 32 and a pair of wings 34 having leading and trailing edges 38, 40 respectively. Lines 36 are painted on the upper surface 50 of the wings 34 and extend along the leading and trailing edges 38, 40 from the wing root 42 to the wing tip 44. Additionally, wide strips 46 are painted on the wing surfaces 50 which function as visual references to aid a pilot in landing the airplane 30. The wide strips 46 are located slightly outboard of the fuselage 32 and extend fore and aft between the painted lines 36. The widths 52, 54 of the lines 36 and wide strips 46 respectively, may vary with the application. In one commercial airplane application, for example, the width 52 of lines 36 may be approximately 1 inch, and the width 54 of wide strips 46 may be approximately 15 inches.

Figure 3:
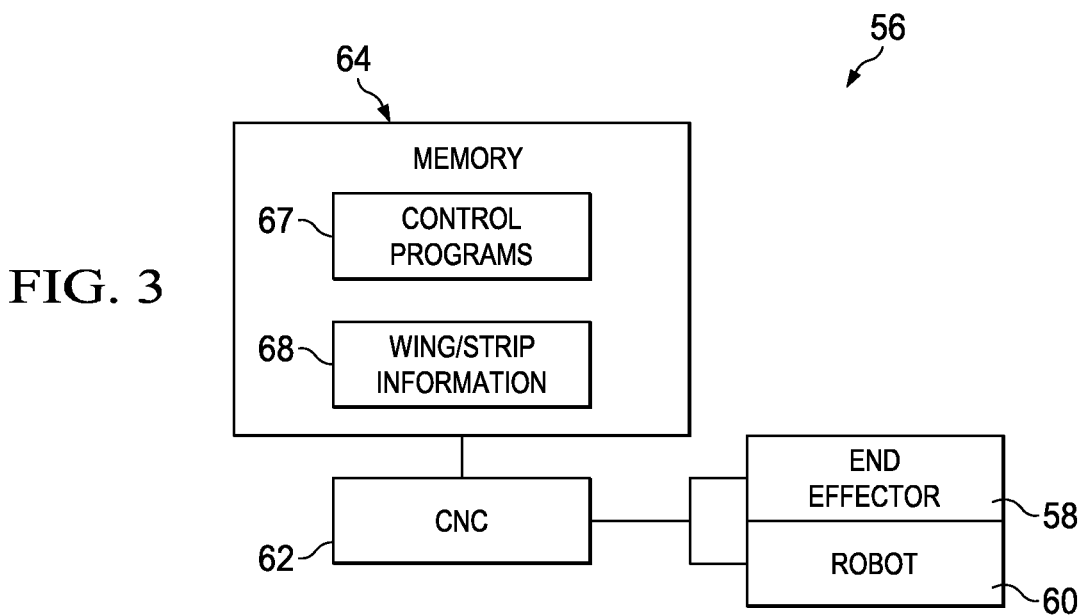
FIG. 3 is an illustration of a functional block diagram of apparatus for painting features on a surface.

FIG. 3 illustrates apparatus 56 for painting the lines 36 and wide strips 46 on the wing surfaces 50 shown in FIGS. 1 and 2. An end effector 58 for painting the lines 36 and wide strips 46 is mounted on a robot 60 or similar robotic manipulator that is controlled by a CNC (computer numerical control) controller 62. The CNC controller 62 includes one or more memories 64 for storing digital control programs 67 and digital information 68 relating to wing geometry configurations and line/strip information for each of the wing geometry configurations. As will be discussed below in more detail, under automatic control by the CNC controller 62, the robot 60 moves the end effector 58 over the wing surfaces 50 and paints the lines 36 and wide strips 46 without the need for masking materials.

Figure 4:
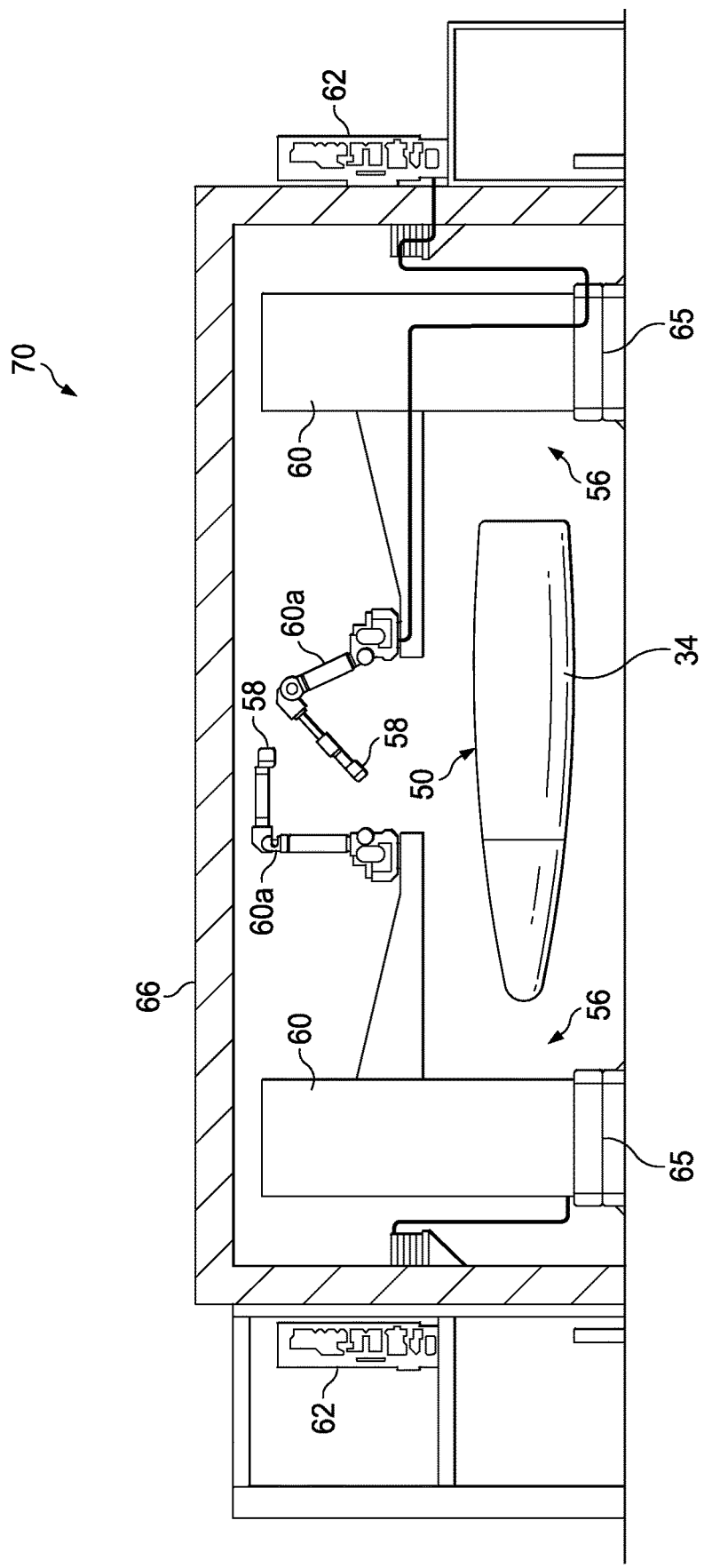
FIG. 4 is an illustration of a side view of a paint booth in which features are being painted onto a wing of the airplane.

FIG. 4 illustrates one arrangement for painting lines 36, wide strips 46 or other features on the surface 50 of a wing 34 or other area of an airplane 30. In this example, the apparatus 56 comprises a pair of the robots 60 mounted for linear movement along tracks 65 within a controlled environment, such as a paint booth 66. A pair of end effectors 58 are mounted on articulated arms 60a of the two robots 60. The CNC controllers 62 may be mounted outside of the paint booth 66 to isolate electrical components of the CNC controllers 62 from volatiles within the paint booth 66. In this example, the robots 60 are moved along the tracks 65 to traverse the length of the wing 34, and their operation is coordinated such that, in combination, the end effectors 58 are moved to various locations over the surface 50 of the wing 34 to paint desired features, such as without limitation, the lines 36 and wide strips 46.

Figure 5:
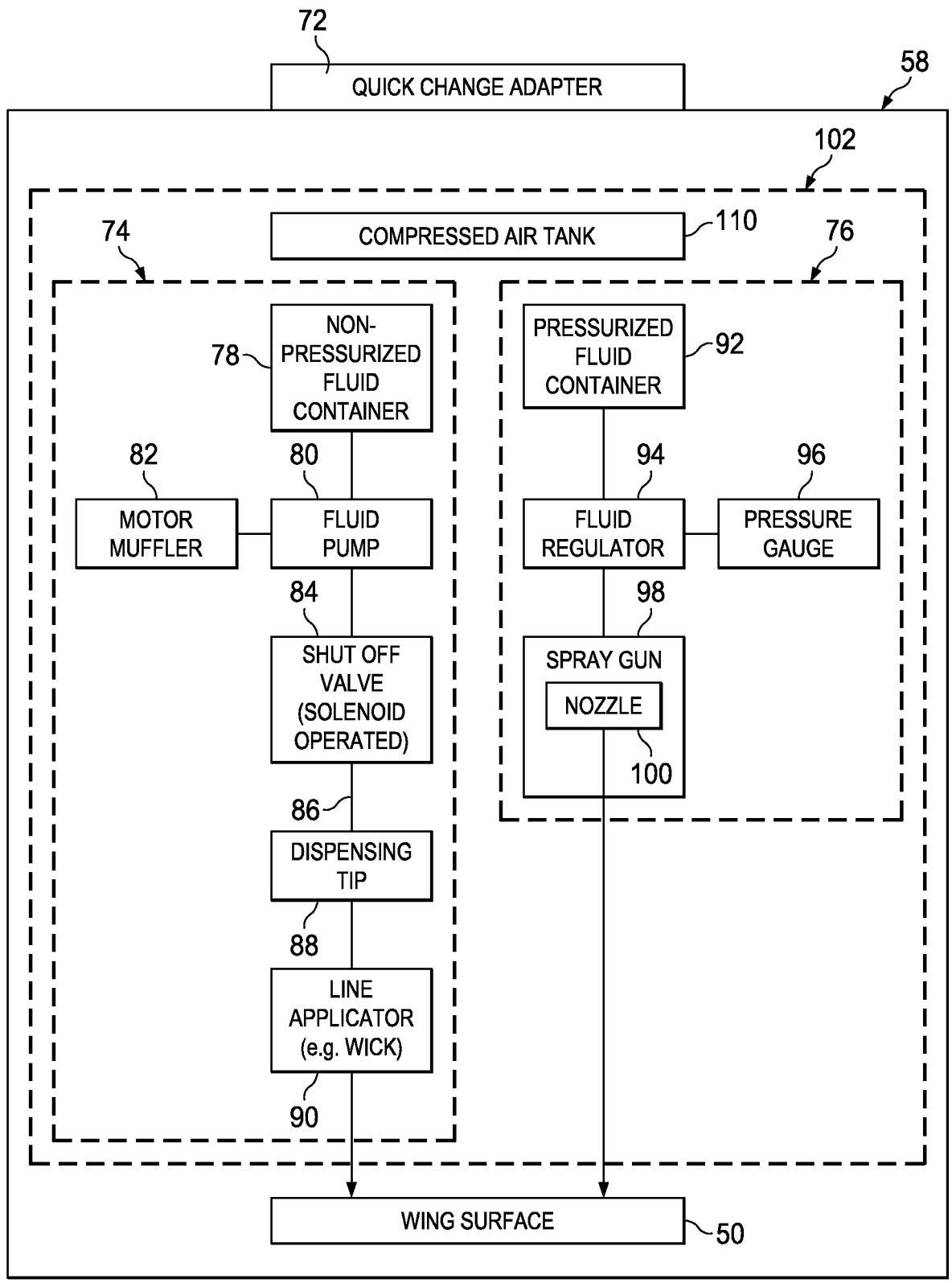
FIG. 5 is an illustration of a functional block diagram of a robotic end effector forming part of the apparatus.
Figure 6:
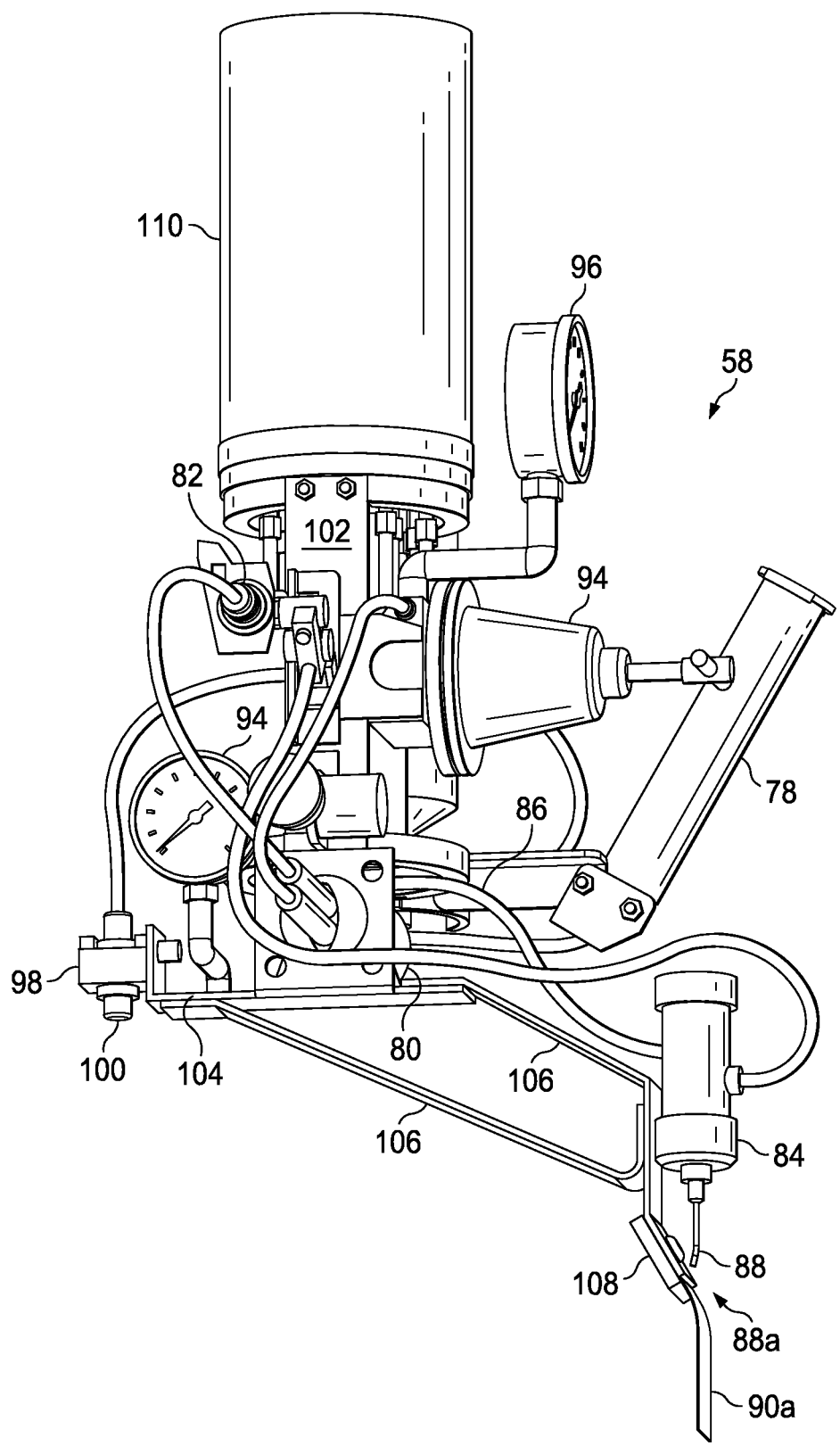
FIG. 6 is an illustration of a perspective view of the end effector.
Figure 7:
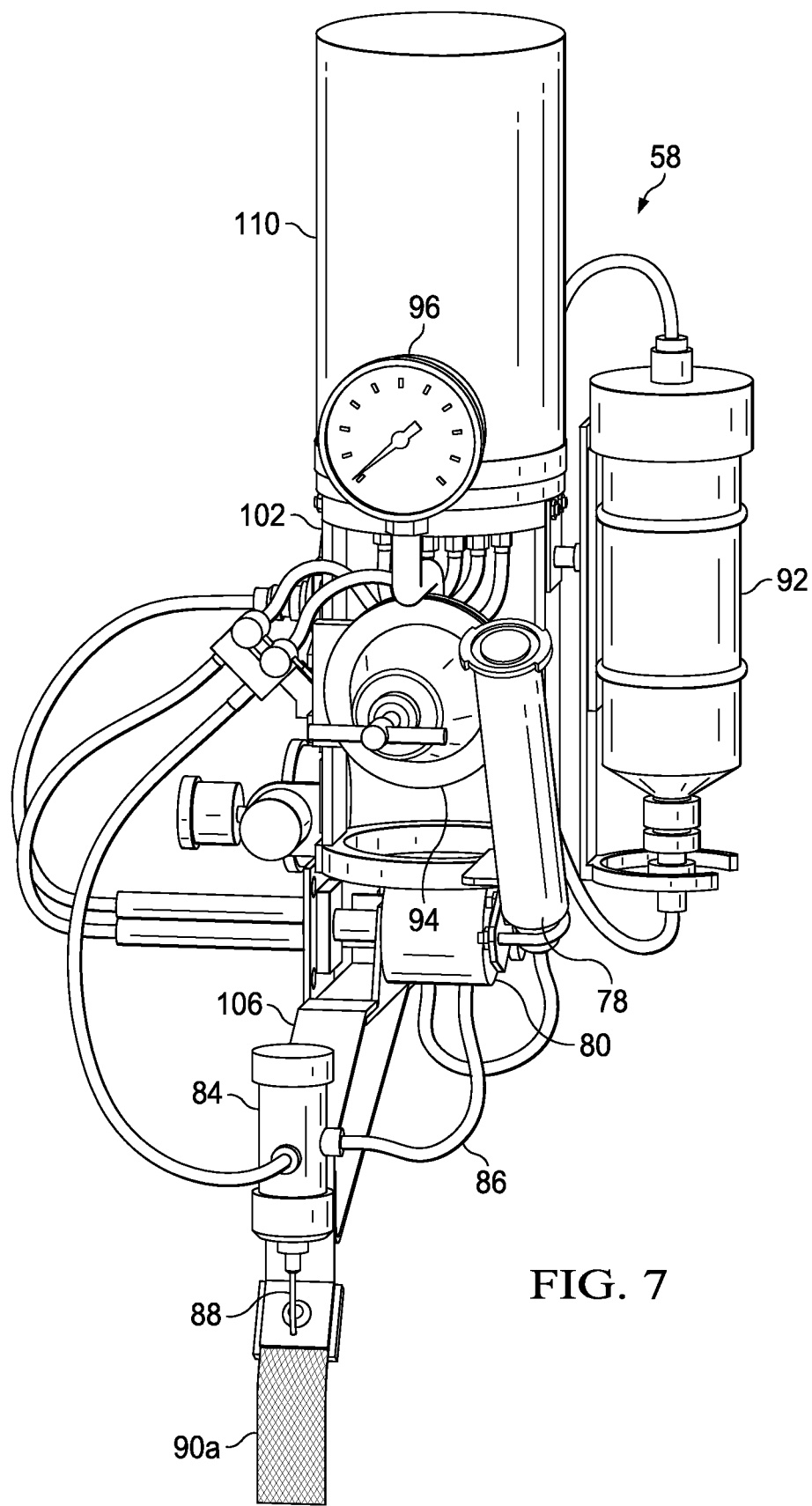
FIG. 7 is an illustration of a front isometric view of the end effector.

Attention is now directed to FIGS. 5, 6 and 7 which illustrate additional details of the end effector 58. The end effector 58 includes head 102 that serves as a structural frame on which various components discussed below are be mounted. The head 102 is supported on and is releasably connected to the robot 60 by a quick-change adapter 72. A line painting system 74 and a spray painting system 76 are mounted on the head 102 and, as will be discussed below, may be operated independently or in combination to paint features on a surface 50, such as the lines 36 and wide strips 46 shown in FIGS. 1 and 2. In the illustrated embodiment, a compressed air tank 110 is mounted on the head 102 and acts as a source of pressurized air for operating various pneumatic powered components of the two painting systems 74, 76. In other embodiments, however, the supply of compressed air may be remotely located, off-board the end effector 58 and coupled with the painting systems 74, 76 by pneumatic lines (not shown).

The line painting system 74 may be provided with an onboard, non-pressurized fluid container 78 for holding a quantity of paint or other coating fluid that is to be painted as lines 36 onto the wing surface 50. In other embodiments, however the coating fluid may be drawn from a bulk fluid supply (not shown) located off-board the end effector 58. A fluid pump 80 draws fluid from the fluid container 78 and pumps it through a shut off valve 84 and dispensing tube 86 to a dispensing tip 88. The fluid pump 80 comprise a pneumatically powered motor driven positive displacement pump such as a peristaltic pump that is provided with a motor muffler 82 for reducing motor exhaust noise.

The shut off valve 84 may comprise a pneumatically controlled solenoid valve that is selectively opened and closed to control the flow of fluid to the dispensing tip 88. The dispensing tip 88 includes an outlet (not shown) at the distal end (FIG. 6) thereof which dispenses the fluid onto a line applicator 90 which, in the exemplary embodiment, comprises a wick 90*a*. The wick 90*a* becomes saturated with the fluid dispensed from the dispensing tip 88, and as will be discussed below, is capable of flowing the fluid onto the surface 50. The wick 90*a* is removably attached to a wick holder 108 (FIGS. 6 and 7) at the end of a pair of support arms 106 extending forwardly from and connected to the head 102. The shut off valve 84 is also mounted on the outer end of the support arms 106.

The spray painting system 76 includes a pressurized fluid container 92, a fluid regulator 94 and a coating fluid spray gun 98 having a nozzle 100 from which paint or other coating fluid may be sprayed onto the wing surface 50. In the illustrated embodiment, the pressurized fluid container 92 is mounted on the head 102, however in other embodiments the pressurized fluid container may comprise a bulk fluid tank (not shown) located off-board the end effector 58. The fluid pressure regulator 94 may include controls to regulate the pressure and flow of the fluid to the spray gun 98. A pressure gauge 96 may be coupled with the fluid regulator to display the fluid pressure. As best seen in FIG. 6, the spray gun 98 is supported on an arm 104 that is attached to the head 102. The spray gun 98 is mounted on the forward end of the end effector 58, and the nozzle 100 is oriented to spray fluid downwardly from the spray gun 98. The wick 90*a* along with the dispensing tip 88 is mounted on the rear or trailing end of the end effector 58. The spray gun 98 and line applicator 90 may be mounted in other locations on the head 102, depending upon the application. In some embodiments, the end effector 58 may include more than one line painting system 74 and more than one spray tanning system 76, depending on the application, and/or the size and shapes of the features to be painted.

Figure 8:
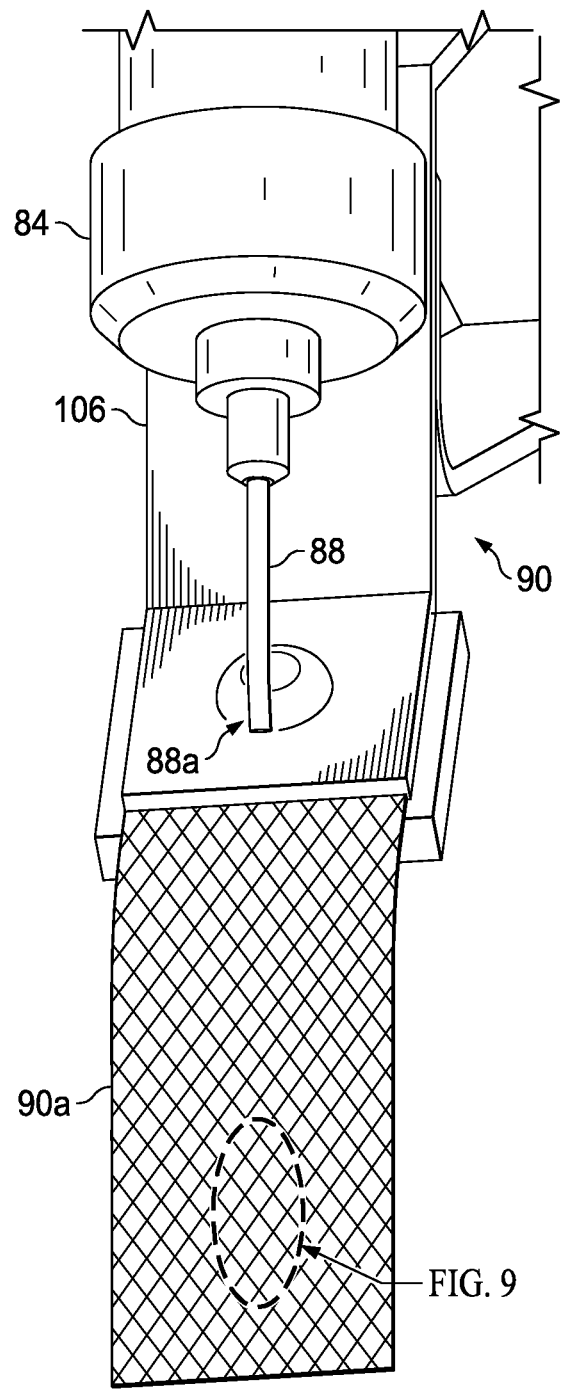
FIG. 8 is an illustration of a perspective view of the dispensing tip and the wick forming part of the end effector.
Figure 9:
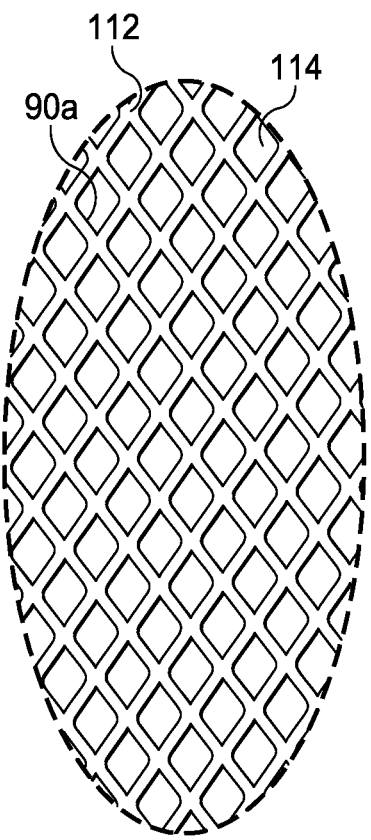
FIG. 9 is an illustration of the area designated as "FIG. 9" in FIG. 8.

FIGS. 8 and 9 illustrate additional details of the applicator wick 90*a* and dispensing tip 88. The applicator wick 90*a* may comprise any suitable flexible and compliant material capable of being saturated with and holding paint or other coating fluid, and flowing the fluid onto the surface to be coated, such as the wing surface 50. In the illustrated example, the applicator wick 90*a* comprises a woven or knitted flexible gauze 112 having openings 114 that are capable of being saturated with and holding the fluid, and flowing it onto a surface 50. However, a variety of other materials and material arrangements may be employed as the line applicator 90 including, without limitation, one or more brushes (not shown). The illustrated wick 90*a* has straight, parallel edges 89 and a width 91 corresponding to the width of the line e.g. lines 36 (FIGS. 1 and 2). However, the wick may have other geometries, depending on the type of line being painted. For example and without limitation, the wick 90*a* may have a tapered geometry, in which case, lines 36 with varying widths may be painted by using the robot 60 to change the elevation of the head 102 above the surface 50 being painted.

The flexible and compliant nature of the wick 90*a* allows it to conform varying surface geometries. For example, referring to FIGS. 10A and 10B, the applicator wick 90*a* remains in contact with the surface 50 when the head 102 undergoes minor changes in elevation, such as a displacement from a height $H_1$ shown in FIG. 10 to a lower height $H_2$ shown in FIG. 10B. Similarly, as shown in FIG. 11, the applicator wick 90*a* remains in contact with undulating surfaces 50 that may have minor peaks 50*a* and valleys 50*b*, as the head 102 moves 116 along the surface 50 at a constant elevation. The robot 60 may move the end effector 58 along any desired path in three dimensions. For example, referring to FIG. 12, the line painting system 74 may be moved along a curved path to paint lines 36*a* having one or more complex curves rather non-linear geometries.

Figure 13:
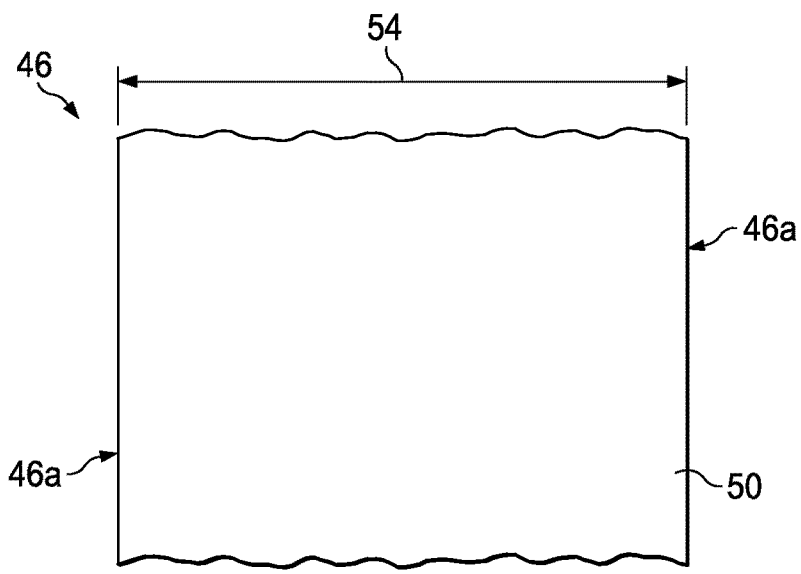
FIG. 13 is an illustration of a plan view of a portion of a surface, showing the intended location of a wide paint strip to be painted on the surface.
Figure 14:
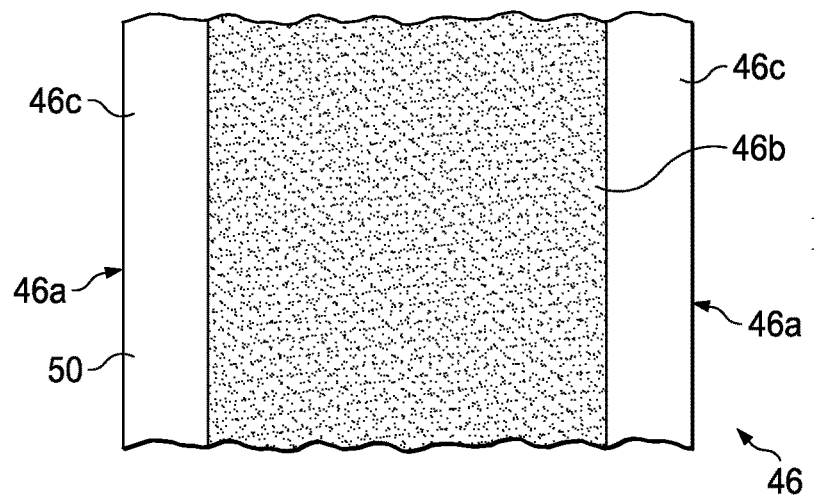
FIG. 14 is an illustration similar to FIG. 13, but showing a central portion of the wide paint strip having been spray-painted.
Figure 15:
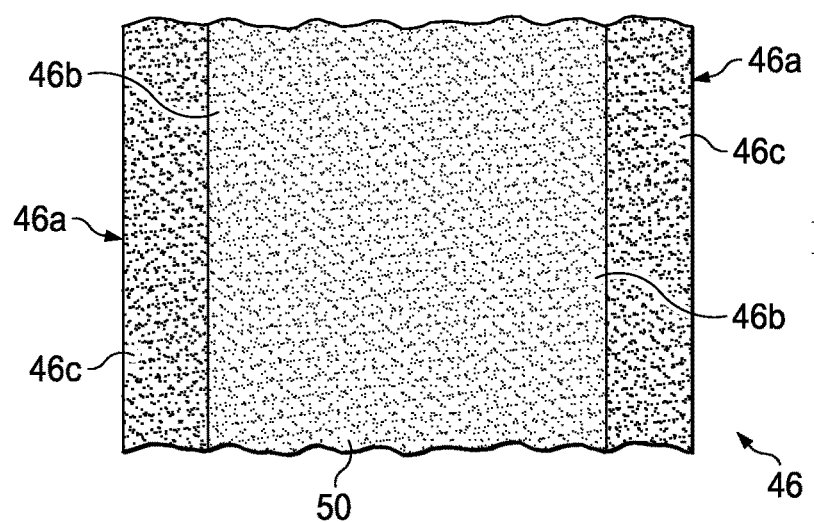
FIG. 15 is an illustration similar to FIG. 14, but showing the outer edges of the wide paint strip having been painted by the wick.

Attention is now directed to FIGS. 13, 14 and 15 which illustrate a method of painting strips on a surface, such as the wide strips 46 on the wing surface 50 shown in FIGS. 1 and 2. As shown in FIG. 13, wide strip 46 intended to be painted has a predetermined width 54 and sharp outer edges 46*a*. In one variation of the method, the end effector 58 is moved over the surface 50 along a desired path and the spray painting system 76 is used to spray paint a centrally located section 46*b* of the wide strip 46 between the outer edges 46*a* of the wide strip 46. Then, in one or more subsequent passes of the end effector 58, the line painting system 74 is used to paint outer lines 46*c* on opposite sides of the centrally located section 46*b*. The outer lines 46*c* may be contiguous to or overlie the centrally located section 46*b* and are substantially aligned with the outer edges 46*a* of the wide strips 46. In another embodiment of the method, the outer lines 46*c* may be painted, following which the centrally located section 46*b* is spray-painted.

Figure 16:
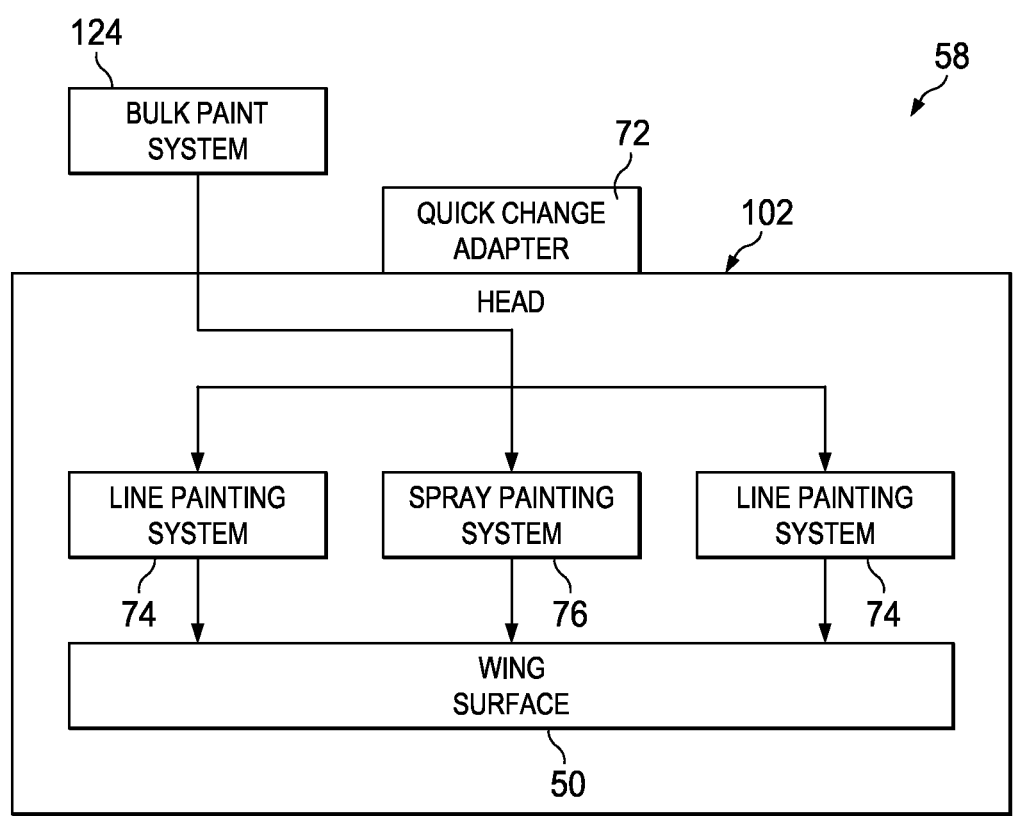
FIG. 16 is an illustration of a functional block diagram of an alternate embodiment of the end effector having a pair of line painting systems and a remote bulk paint supply.

As previously mentioned, in some embodiments, the end effector 58 may be provided with more than one line painting system 74 and spray painting system 76. For example, FIG. 16 illustrates an alternate embodiment of the end effector 58 that carries 2 line painting systems 74 that are positioned on opposite sides of a centrally located spray painting system 76. In this example, the fluid, such as paint, is supplied to the line painting system 74 and spray painting system 76 from one or more off-board bulk paint supplies 124. The embodiment of FIG. 16 is well-suited to paint wide paint strips, such as the wide strips 46 on the airplane wings 34 shown in FIGS. 1 and 2. In a single pass of the end effector 58 over a surface 50, the line painting systems 74 respectively paint the outer lines 46c (FIG. 15), while the spray painting system 76 paints the centrally located section 46b. Although not shown in the Figures, the spray painting system 76 may be offset or staggered from the line painting systems 74 in the direction of travel of the end effector 58, or it may be laterally aligned with the line painting systems 74, in which case the outer lines 46c and centrally located section 46b are painted at substantially the same time in a single pass of the end effector 58 over surface 50.

Figure 17:
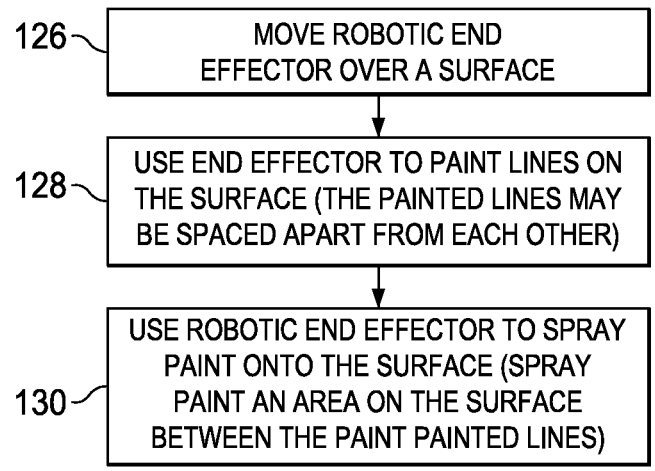
FIG. 17 is an illustration of a flow diagram of a method painting features on a surface.

FIG. 17 broadly illustrates the overall steps of a method of painting strips on a surface 50. Beginning at 126, a robotic end effector 58 is moved over the surface 50, and at 128 the end effector 58 is used to paint lines 36 on the surface 50. The lines 36 may be painted using a line applicator 90 such as a wick 90a forming part of the line painting system 74 carried on at the end effector 58. The painted lines 36 maybe spaced apart from each other, as shown in FIG. 15. At 130, the robotic end effector 58 is used to spray paint onto the surface 50. A central area between two painted lines 36 maybe spray-painted using the spray painting system 76 on the end effector 58.

Figure 18:
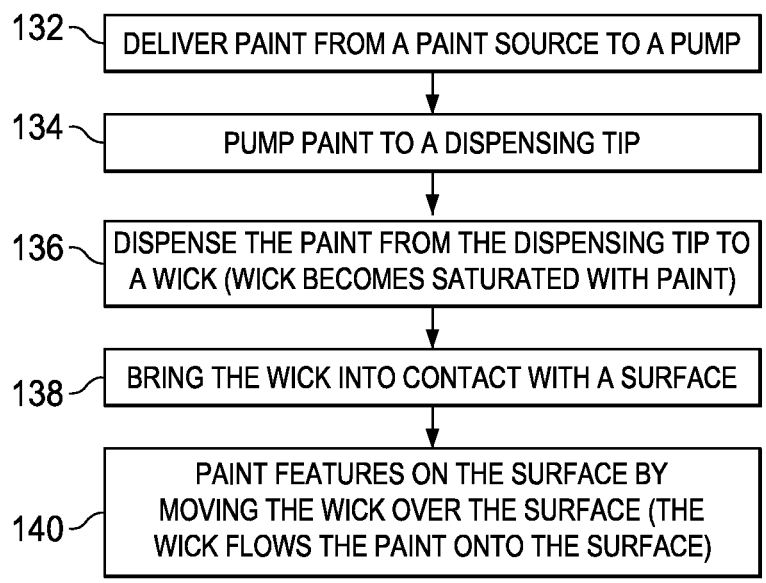
FIG. 18 is an illustration of a flow diagram of a maskless painting method.

Attention is now directed to FIG. 18 which broadly illustrates the overall steps of a maskless painting method. At 132, paint is delivered a paint source 78 to a fluid pump 80 which, as previously mentioned may comprise a pneumatically driven peristaltic pump. At 134, paint is pumped to a dispensing tip 88. At 136, the paint is dispensed from the dispensing tip 88 to a wick 90a or similar line applicator 90, causing the wick 90a to be saturated with paint. At 138, the wick 90a is brought into contact with a surface 50 on which one or more features are to be painted. At 140, the features are painted on the surface 50 by moving the wick 90a over the surface 50. As the wick 90a moves over the surface 50, the paint flows from the wick 90a onto the surface 50.

Figure 19:
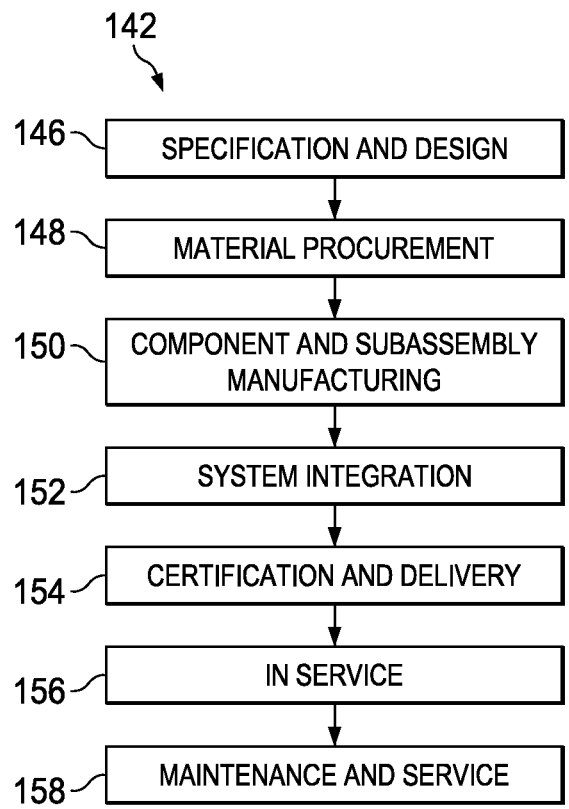
FIG. 19 is an illustration of a flow diagram of aircraft production and service methodology.
Figure 20:
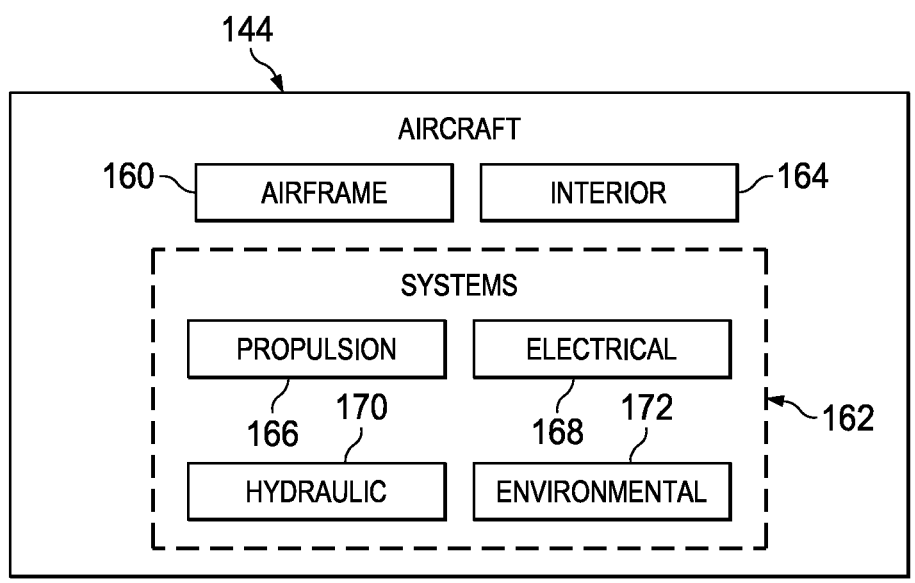
FIG. 20 is an illustration of a block diagram of an aircraft.

Embodiments of the disclosure may find use in a variety of potential applications, particularly in the transportation industry, including for example, aerospace, marine, automotive applications and other application where it is necessary to apply coatings such as paint and desired patterns. Thus, referring now to FIGS. 19 and 20, embodiments of the disclosure may be used in the context of an aircraft manufacturing and service method 142 as shown in FIG. 19 and an aircraft 144 as shown in FIG. 20. Aircraft applications of the disclosed embodiments may include, for example, without limitation, applying patterned coatings on surfaces and painting lines and patterns on wings, stabilizers and fuselages. During pre-production, exemplary method 142 may include specification and design 146 of the aircraft 144 and material procurement 148. During production, component and subassembly manufacturing 150 and system integration 152 of the aircraft 144 takes place. Thereafter, the aircraft 144 may go through certification and delivery 154 in order to be placed in service 156. While in service by a customer, the aircraft 144 is scheduled for routine maintenance and service 158, which may also include modification, reconfiguration, refurbishment, and so on.

Each of the processes of method 142 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 144 produced by exemplary method 142 may include an airframe 160 with a plurality of systems 162 and an interior 164. The disclosed method and apparatus may be employed to paint lines and other features on the aircraft's skin forming part of the airframe 160. Examples of high-level systems 162 include one or more of a propulsion system 166, an electrical system 168, a hydraulic system 170 and an environmental system 172. Any number of other systems may be included. Although an aerospace example is shown, the principles of the disclosure may be applied to other industries, such as the marine and automotive industries.

Systems and methods embodied herein may be employed during any one or more of the stages of the production and service method 142. For example, components or subassemblies corresponding to production process 150 may be fabricated or manufactured in a manner similar to components or subassemblies produced while the aircraft 144 is in service 1566. Also, one or more apparatus embodiments, method embodiments, or a combination thereof may be utilized during the production stages 150 and 152, for example, by substantially expediting assembly of or reducing the cost of an aircraft 144. Similarly, one or more of apparatus embodiments, method embodiments, or a combination thereof may be utilized while the aircraft 144 is in service, for example and without limitation, to maintenance and service 158.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for applying a patterned coating on a surface, comprising:
    a fluid pump adapted to pump a coating fluid;
    a line applicator adapted to be brought into contact with the surface for applying a line of the coating fluid on the surface;

a dispensing tip coupled with the fluid pump and the line applicator for dispensing the coating fluid to the line applicator;
a spray gun adapted to be coupled with a source of the coating fluid for spraying the coating fluid onto the surface; and
a manipulator having the line applicator, the dispensing tip, and the spray gun mounted thereon, wherein the spray gun is mounted offset from the line applicator.

2. The apparatus of claim 1, wherein the line applicator includes a wick adapted to be drawn over the surface and apply the line of the coating fluid on the surface, wherein the wick consists of a woven material or a knitted material.

3. The apparatus of claim 1, wherein the line applicator is flexible and is adapted to be drawn across the surface.

4. The apparatus of claim 3, wherein:
the line applicator includes a flexible gauze, wherein the gauze consists of a woven material or a knitted material; and
the dispensing tip includes an outlet through which the coating fluid is dispensed onto the gauze.

5. The apparatus of claim 1, further comprising:
a valve coupled between the fluid pump and the dispensing tip for controlling a flow of the coating fluid from the fluid pump to the dispensing tip.

6. The apparatus of claim 5, wherein each of the fluid pump and the valve are pneumatically operated.

7. The apparatus of claim 1, further comprising:
a CNC controller including digital control programs for controlling the manipulator.

8. The apparatus of claim 7, wherein the digital control programs for controlling the manipulator comprise:
a digital control program for painting a pair of spaced apart lines onto the surface; and
a digital control program for spraying paint on an area of the surface between the pair of spaced apart lines.

9. An apparatus for painting features on a surface using the apparatus of claim 1, the method comprising:
a robot manipulator;
a pump adapted to pump a paint;
an end effector mounted on the robot manipulator, the end effector including:
a line painting system for applying a line of the paint on the surface, including:
a line applicator adapted to be brought into contact with the surface; and
a dispensing tip coupled with the pump and the line applicator for dispensing the paint to the line applicator;
a paint spray system for spraying paint on the surface, including:
a spray gun mounted offset from the line applicator and adapted to be coupled with a source of the paint; and
a controller including digital control programs for controlling the robot manipulator and the end effector.

10. The apparatus of claim 9, wherein the line painting system includes:
a flexible wick adapted to hold and flow paint onto the surface.

11. A method of painting features on a surface using the apparatus of claim 1, the method comprising:
pumping a paint with a pump to a robotic end effector mounted on a manipulator;
moving the robotic end effector over the surface, the robotic end effector having a line applicator, a dispensing tip, and a spray gun mounted thereon, wherein the spray gun is mounted offset from the line applicator;
moving the robotic end effector over the surface to paint the surface, including:
dispensing the paint from the dispensing tip to the line applicator, wherein the dispensing tip is coupled with the pump and the line applicator;
bringing the line applicator into contact with the surface to apply a line of paint on the surface; and
spraying paint onto the surface from the spray gun coupled with a source of paint.

12. The method of claim 11, wherein:
applying the line of paint on the surface includes applying a pair of spaced apart lines onto the surface; and
spraying paint onto the surface includes spraying paint on an area of the surface between the pair of spaced apart lines.

13. The method of claim 11, wherein the line applicator comprises a flexible wick adapted to hold and flow paint onto the surface.

14. A maskless painting method using the apparatus of claim 1, the method comprising:
delivering paint from a source of paint to a pump;
pumping the paint from the pump to a dispensing tip and a spray gun;
dispensing the paint from the dispensing tip to a line applicator, wherein the line applicator is mounted offset from the spray gun;
bringing the line applicator into contact with a surface;
applying a line of paint on the surface by moving the line applicator over the surface; and
spraying paint onto the surface from the spray gun.

15. The maskless painting method of claim 14, further comprising:
delivering the paint from the pump to a valve; and
using the valve to control a flow of the paint from the pump to the dispensing tip.

16. The maskless painting method of claim 14, wherein:
moving the line applicator over the surface is performed using a numerically controlled manipulator programmed to move the line applicator along a path forming the line of paint.

17. The maskless painting method of claim 14, wherein:
dispensing the paint to the line applicator includes substantially saturating the line applicator with the paint; and
moving the line applicator over the surface includes flowing the paint from the line applicator onto the surface.

18. The maskless painting method of claim 14, further comprising:
controlling a flow of the paint pumped from the pump to the dispensing tip by passing the paint through a valve.

19. The apparatus of claim 1, further comprising:
a robotic end effector comprising a head adapted to be mounted on the manipulator, wherein the line applicator, the dispensing tip, and the spray gun mounted on the manipulator via the robotic end effector.

20. The apparatus of claim 19, further comprising:
the source of the coating fluid carried on the head for supplying paint to the pump and to the spray gun.

21. A robot for painting features on a surface, comprising:
a manipulator;
a head mounted on the manipulator and moved over the surface;
a line applicator mounted on the head for applying a line of paint on the surface, the line applicator being adapted to be brought into contact with and moved over the surface by the manipulator;

a pump adapted to pump a source of paint;

a dispensing tip mounted on the head and coupled with the pump and the line applicator for dispensing paint to the line applicator; and a spray gun mounted on the head and offset from the line applicator, the spray gun being adapted to be coupled with a source of the paint for spraying the paint onto the surface.

22. The robot of claim 21, further comprising:

a valve mounted on the head and coupled between the pump and the dispensing tip for controlling delivery of paint from the pump to the dispensing tip.

23. The robot of claim 22, wherein the pump and the valve are each mounted on the head and are pneumatically operated.

24. The robot of claim 21, wherein the line applicator is a compliant wick adapted to flow the paint on to the surface.

25. The robot of claim 24, wherein the compliant wick is configured to flow a line of the paint onto the surface.

26. The robot of claim 21, further comprising:

the source of paint carried on the head for supplying the paint to the pump and to the spray gun.

* * * * *